United States Patent [19]

Lapeyre

[11] Patent Number: 4,552,177
[45] Date of Patent: Nov. 12, 1985

[54] HERMETICALLY SEALED VALVE

[75] Inventor: James M. Lapeyre, New Orleans, La.

[73] Assignee: Laitram Corporation, Inc., New Orleans, La.

[21] Appl. No.: 503,717

[22] Filed: Jun. 13, 1983

[51] Int. Cl.⁴ .......................... F16K 31/10; F16K 7/18
[52] U.S. Cl. ................................ 137/625.28; 251/65; 251/129.11; 251/901
[58] Field of Search .................. 251/133, 65, DIG. 2, 251/331, 139; 137/625.28

[56] References Cited

U.S. PATENT DOCUMENTS

| 2,297,082 | 9/1942 | Staats | 251/266 X |
| 2,720,378 | 10/1955 | Otto | 251/DIG. 2 |
| 2,977,972 | 4/1961 | Billeter et al. | 251/DIG. 2 |
| 3,355,140 | 11/1967 | Andersen | 251/65 |
| 3,690,344 | 9/1972 | Brumm | 251/DIG. 2 |
| 4,452,423 | 6/1984 | Beblavi et al. | 251/65 |

FOREIGN PATENT DOCUMENTS 1200372  6/1959  France ................................ 251/65

Primary Examiner—Arnold Rosenthal
Attorney, Agent, or Firm—Keaty & Keaty

[57] ABSTRACT

A hermetically sealed valve has a magnetically actuated rolling diaphragm valve mechanism, and providing an in-line variable opening valve that is completely sealed and requires no shaft, bushings or moving components through the valve body. This provides a valve with a generally in-line flow, which may be completely isolated from contaminants or from the outside environment. The magnetic actuating mechanism permits precise gradual positional control of the valve and at the same time provides considerably greater actuation force against differential pressure across the valve than has previously been possible. The valve actuation mechanism is readily adaptable to digital control techniques.

6 Claims, 3 Drawing Figures insulation is required, and no electrical power need be introduced into the flow stream.

I claim:

1. A hermetically sealed valve for the continuous control of the flow of a liquid comprising:
   a lower fluid region for intake of a liquid flow;
   a plurality of internal flow restriction orifices, each orifice having an inlet and an outlet side, the inlet sides of which are fluidly connected with and form a terminator for the lower fluid region;
   an upper fluid region in fluid communicating relationship with the lower fluid region through the flow restriction orifices;
   a continuous diaphragm member sealingly connected from below said internal flow restriction orifices, sealing upwardly across said orifices, folding back upon itself, the diaphragm member being connected to an actuating means, the actuating means comprising a moveable cup having a lower driving section through which fluid passes and to which a first edge of the diaphragm member is attached, and an annular diaphragm support wall extending upwardly from the driving section;
   said actuating means rollingly actuating said diaphragm between a lower position, wherein said orifices establish fluid communication between said upper and lower region, and an upper position, wherein said orifices are fluidly sealed by the diaphragm member to prevent fluid communication between said lower and upper regions;
   screw driving means connected to said actuating means and extending below said actuating means in its lower position, rotation of said screw driving means moving said actuating means between its upper and lower positions;
   magnetic rotation means affixed drivably to said screw driving means of the actuating means;
   external magnetic field generation means which generates a controlled rotational magnetic field tangentially about said magnetic rotation means for rotating said rotation means and moving said actuating means between its upper and lower positions.

2. A valve as described in claim 1 above wherein said terminator further comprises:
   a vertically extensive cylindrical section sealingly affixed above said lower chamber having therein a plurality of oblong fluid orifices;
   a closed upper end of said cylindrical section whereby flow upwards from said lower chamber is restricted to said orifices.

3. A valve as described in claim 2 above wherein said diaphragm further comprises:
   an elastometic annular diaphragm having an upper edge and a lower edge;
   said lower edge being sealingly affixed within an annular region within said lower chamber approximately at the base of said cylindrical section;
   said diaphram rising vertically against said oblong orifices;
   said diaphragm being rolled inwardly at its top edge to form an inwardly and downwardly turned lip which is affixed around an annular region on the perimeter of said actuating means.

4. A valve as described in claim 1 wherein said magnetic rotation means further comprises:
   force receiving movement means connected to the sealing means within the valve;
   screw engaging drive means axially affixed within said movement means;
   an internal screw, rotatably engaged to said screw drive means, vertically positioned the internal valve axis between the upper and the lower extreme positions of movement of said actuating means;
   magnetic rotation drive means affixed orthogonally to said screw;
   external magnetic field generation means adapted for generating a controlled rotational magnetic field tangentially about said magnetic rotation means within said valve, whereby said magnetic rotation means rotates conformably to said external field.

5. A valve as described in claim 3 above wherein said actuating means further comprises:
   a moveable cylindrical cup which further comprises;
   a fluid passing lower driving section;
   an anchoring means for the upper end of said diaphram affixedly mounted at the upper circumferential edge of the driving section;
   a substantially vertical cylindrical diaphram support wall vertically arising above said diaphram anchoring means.

6. A hermetically sealed valve for the continuous control of the flow of a liquid, comprising:
   a lower fluid region for intake of a liquid flow;
   a plurality of internal flow restriction orifices, each orifice having an inlet and an outlet side, the inlet sides of which are fluidly connected with and form a terminator for the lower fluid region;
   an upper fluid region in fluid communicating relationship with the lower fluid region through the flow restriction orifices;
   a continuous diaphragm member sealingly connected from below said internal flow restriction orifices, sealing upwardly across said orifices, folding back upon itself, the diaphragm member being connected to an actuating means;
   said actuating means rollingly actuating said diaphragm between a lower position, wherein said orifices establish fluid communication between said upper and lower region, and an upper position, wherein said orifices are fluidly sealed by the diaphragm member to prevent fluid communication between said lower and upper regions;
   screw driving means connected to said actuating means and extending below said actuating means in its lower position, rotation of said screw driving means moving said actuating means between its upper and its lower position;
   magnetic rotation means affixed drivably to said screw driving means of the actuating means;
   external magnetic field generation means which generates a controlled rotational magnetic field tangentially about said magnetic rotation means for rotating said rotation means; said magnetic rotation means further comprising:
   force receiving movement means connected to the sealing means within the valve;
   screw engaging drive means axially affixed within said movement means;
   an internal screw, rotatably engaged to said screw drive means, vertically positioned the internal valve axis between the upper and lower positions of movement of said actuating means;
   magnetic rotation drive means affixed orthogonally to said screw;
   external magnetic field generation means adapted for generating a controlled rotational magnetic field tangentially about said magnetic rotation means within said valve, whereby said magnetic rotation means rotates in response to said external field.

* * * * *

HERMETICALLY SEALED VALVE

BACKGROUND OF THE INVENTION

This invention relates to an improved flow control valve, which provides a substantially in-line flow direction, and which, in its preferred embodiment, can be inserted within a continuous length of pipe. The valve itself is hermetically sealed and is controllable for variable flow positioning without requiring any shafts or any moving elements to be inserted through the valve wall. All valve seals are therefore stratic pressure seals, and the valve is hermetically sealed, being immersed completely in the fluid but having no chance of leakage or cross contamination from outside influences.

The valve comprises an improved rolling diaphragm mechanism especially modified to provide an even-fluid balance and installed so that the flow of liquid through the valve aide the sealing action of the diaphragm. The mechanical configuration is such that, in the closed position, pressure differential forces across the diaphragm resisting opening are completely balanced, thus enhancing the minimum opening forces characteristic of a rolling diaphragm valve mechanism, and permitting higher fluid pressure differentials to be valued that has heretofore been possible with such valving mechandisms.

The valve is driven by a novel magnetically driven screw mechanism.

The magnetic drive for the screw comprises a multi-pole radial driven element with a matching external multi-pole magnetic drive. This drive mechanism provides considerably stronger magnetic drive forces than the linear magnetic positioning devices currently used in the art, and in addition, provides for increased positional control by permitting arbitrarily small angular positioning of the valve internal drive mechanism.

In summary, the valve represents an improved in-line flow control mechanism providing significantly increased actuating force against pressure differential and flow, a significantly increased flow control capability, and a total hermetical seal against outside contamination, all embodied in an in-line mechanism which can be inserted within an existing length of flow pipe.

DETAILED DESCRIPTION OF THE PREFERRED EMBODIMENT

Figure 1:
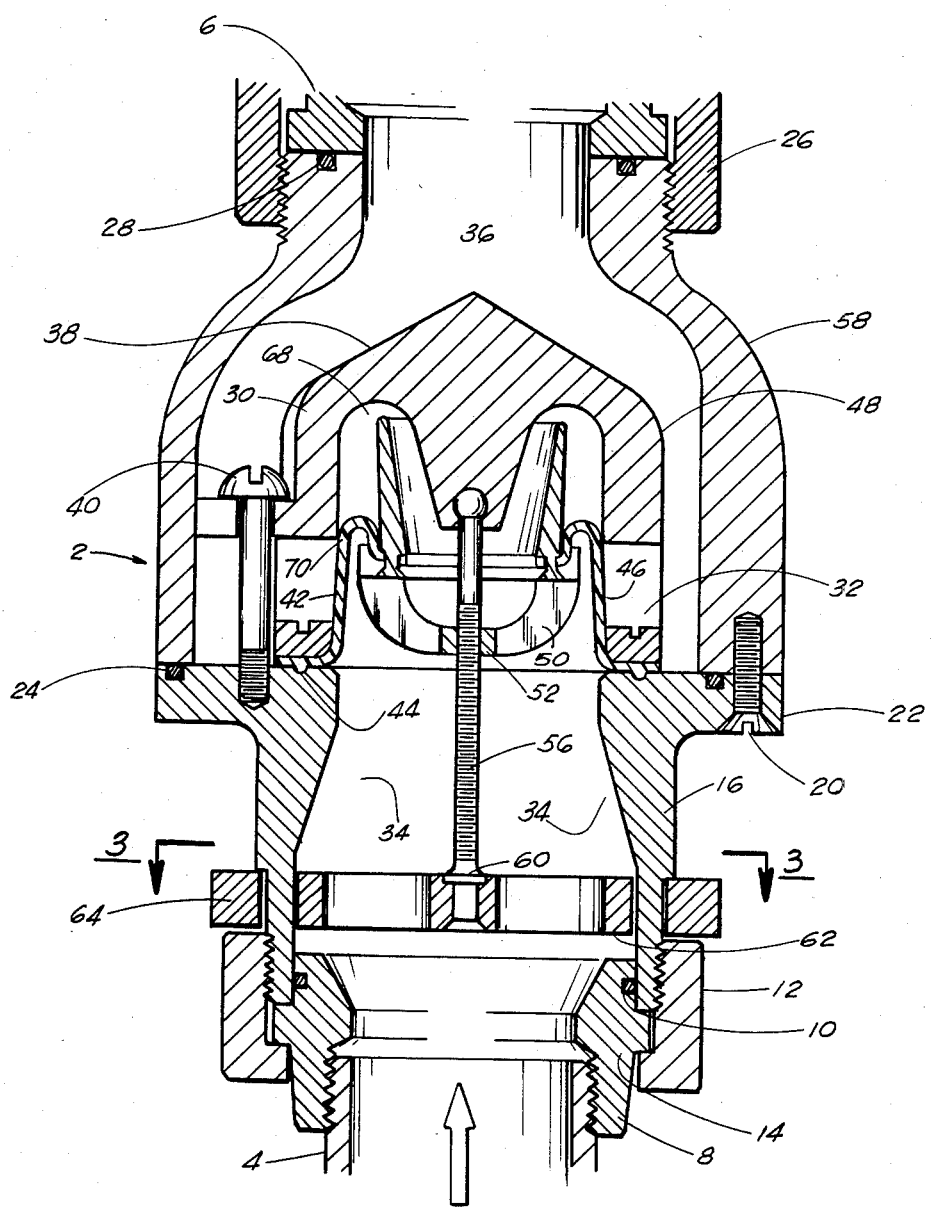
FIG. 1 shows a cutaway view of the valve as insertedly in-line within a flow pipe, the valve being in a closed position.
Figure 2:
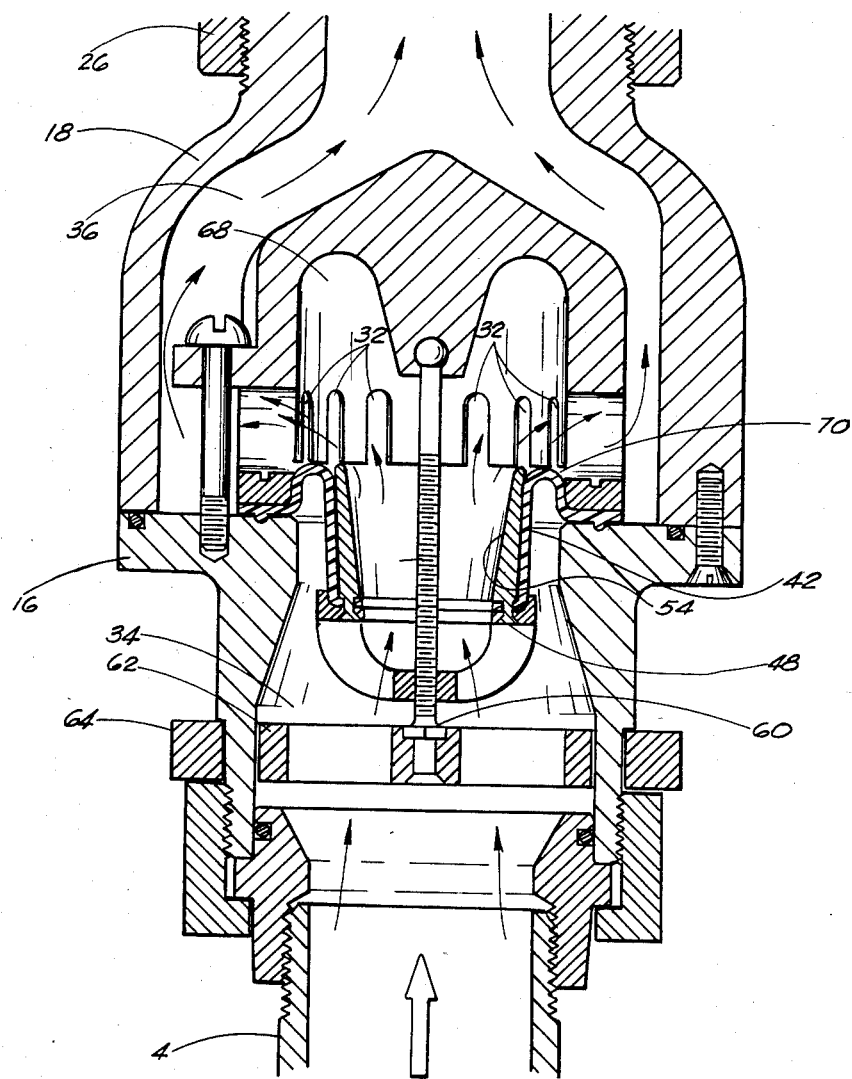
FIG. 2 shows a cutaway view of the valve as inserted in-line in a flow pipe with the valve in an open position showing the flow of liquid therethrough.

Referring to FIG. 1, the general outline of the improved valve 2 is shown inserted in-line between an inlet flow pipe 4 and an outlet flow pipe not shown. Threadably affixed to the top of inlet flow pipe 4 is a threaded sealing adaptor 8 having therein an O-ring seal 10 annularly about its upward outer face, and a mating clamping member 12 adapated to a flange 14. Said clamping adaptor 12 threadedly affixes and clamps the lower section 16 of the valve body against the O-ring seal 10 and the threaded adaptor 14 providing an in-line liquid-tight seal.

Lower valve body 16 is comprised of a non-magnetic material, such as, for example, bronze. An upper valve body 18, which may either be of the same material as lower valve body 16 or any compatible material, is affixed to lower body 16 by bolts 20. An interface or surface 22 between upper valve body 18 and lower valve body 16 is statically hermetically sealed by a provided O-ring 24 continuously and annularly disposed therebetween around the circumference of the interface surfaces 22. Upper valve body 18 is threadably connected through a second threading adaptor 26 to an upper threaded adaptor 6 which then connects to the outlet pipe (not shown) in the same manner as bottom threaded adaptor 8 and clamping adaptor 12 connects to inlet pipe 4. An O-ring 28 is provided for an upper hermetic seal.

A totally in-line valve having a hermetically sealed flow path is contained within lower pipe 4, adaptor 8, lower valve body 16, upper valve body 18, upper adaptor 6, and upper flow pipe (not shown). Within this flow path, symmetrically positioned, is an inner flow control means 30 having a plurality of radially spaced elongated flow orifices 32, circumferentially positioned around control means 30, providing a fluid connection from a lower fluid flow region 34, circumscribed by the inner surface of control means 30 and lower valve body 16, to an upper fluid flow region 36, formed by the inner surface of upper valve body 18 and the outer surface of fluid control means 30. Said outer surface is preferably in a turbulence suppressing smooth shape 38. It is to be noted that said means 30 forms an upper terminator for lower fluid region 34 and a lower terminator for upper fluid region 36.

Control means 30 is secured internally to lower valve body 16 by a plurality of securing bolts 40.

A cylindrical flexible sealing diaphragm 42, having a lower end and an upper end, is securingly clamped in the annular region formed on the interior of the flow orifice 32 and sealing body 30 by clamping the lower end of the diaphragm between flow adaptor 30 and the lower valve body 16 at the radial point 44. Upper end 46 of the diaphragm is clampingly connected to a mid point of an actuating cup 48.

Acutating cup 48 positioned axially within lower fluid region 34 by a diaphragm 42, comprises a lower substantially opened orifice frame 50, having at its center point screw drive receiving means 52, and having at its upper end, a substantially vertical support cup surface 54.

The screw drive receiving means 52 is mated with a rotatable drive screw 56, which is mounted axially along the center line of the valve body, having an upper pivoting bearing 58 within the flow adaptor 30 providing vertical position support while permitting freedom of rotation and being fixably attached at its lower end 60 to radial magnetic drive means 62.

Figure 3:
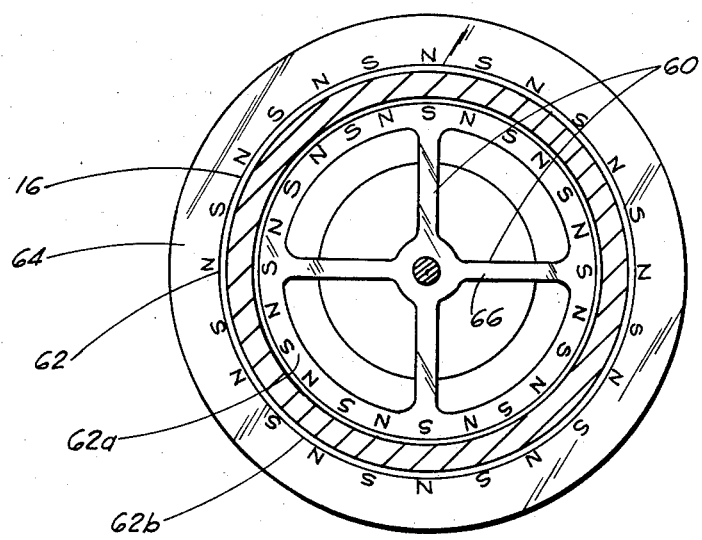
FIG. 3 shows a sectional view through the magnetic drive apparatus on a plane orthogonal to the axis of flow through the valve.

FIG. 3 shows in cross section radial drive magnetic drive means 62 comprising an essentially hollow annular wheel having a rim comprised of multiple alternating magnetic poles, 62A and 62B, for example; the rim is connected to lower end 60 by essentially open connecting means permitting fluid flow, for example spokes 66.

On the outside of the non-magnetic lower valve body 16, horizontally aligned with and circumferentially opposing magnetic drive means 62 is a mating multi-pole